United States Patent [19]

Himeno et al.

[11] Patent Number: 5,505,742
[45] Date of Patent: Apr. 9, 1996

[54] METHOD FOR DYEING HYDROPHOBIC FIBERS BLACK AND DYE USEFUL FOR THE METHOD

[75] Inventors: Kiyoshi Himeno; Kazuhisa Konishi; Ryouichi Sekioka, Kitakyushu, all of Japan

[73] Assignee: Dystar Japan Ltd., Osaka, Japan

[21] Appl. No.: 360,085

[22] Filed: Dec. 20, 1994

[30] Foreign Application Priority Data

Dec. 21, 1993 [JP] Japan .................................. 5-345276

[51] Int. Cl.$^6$ .............................. C09B 67/22; C06P 3/36
[52] U.S. Cl. ........................... 8/639; 8/662; 8/696; 8/922
[58] Field of Search ............................... 8/639, 662, 922, 8/696

[56] References Cited

U.S. PATENT DOCUMENTS 4,401,692  8/1983  Schickluss et al. ........................ 8/471
4,985,044  1/1991  Hähnke et al. ............................ 8/639

FOREIGN PATENT DOCUMENTS 1-314790  6/1988  Japan .

*Primary Examiner*—Margaret Einsmann
*Attorney, Agent, or Firm*—Oblon, Spivak, McClelland, Maier & Neustadt

[57] ABSTRACT

A method for dyeing hydrophobic fibers black, wherein a mixed black dye is used which comprises a blue color component containing at least 70 wt % of a disperse dye of the following formula (I):

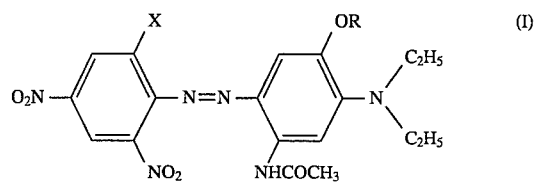

wherein X is a chlorine atom or a bromine atom, and R is a methyl group or an ethyl group.

3 Claims, No Drawings

METHOD FOR DYEING HYDROPHOBIC FIBERS BLACK AND DYE USEFUL FOR THE METHOD

The present invention relates to a method for dyeing hydrophobic fibers black and a dye useful for the method. More specifically, it relates to a method for dyeing hydrophobic fibers black, whereby the fibers will be dyed with a black color which is always free from color rendering even under various standard light sources, and a dye useful for the method.

When hydrophobic fibers such as polyester fibers are dyed black, a phenomenon occurs such that the dyed fibers look black under a certain light source, but they look red brownish black under another light source. Such a phenomenon in which the color looks different depending upon the type of the light source, is called color rendering. For example, it is frequently observed that a formal dress made of a black polyester fiber material looks different from the normal black color under a light source different from natural color, such as a spot light or a chandelier light at a fashion show or in a show window, or under a flash light at photographing.

Hydrophobic fibers including polyester fibers have been dyed with various colors for clothing. However, a demand for dyeing with a black color free from color rendering has increased in recent years. As a method for satisfying this demand, the following method has been proposed, for example, in Japanese Examined Patent Publication No. 18955/1993 or in a journal issued by Shikisen-sha "Senshoku Kogyo (dyeing industry)" vol 35, No. 9, 1987, p. 30–39.

Color rendering is brought about by a difference in the reflectance of lights of specific wavelengths, and the color tends to be reddish, as the reflectance of lights of long wavelengths becomes high. Accordingly, it is conceivable that the tendency for a reddish color can be prevented by lowering the reflectance of lights over the entire visible light wavelength region, particularly by lowering the reflectance of lights of long wavelengths. As a method for using a compound having such a characteristic, Japanese Examined Patent Publication No. 18955/1993 discloses a method of incorporating into a dye a certain specific water insoluble compound having the maximum absorption wavelength at 700–800 nm.

It is an object of the present invention to provide a method for dyeing hydrophobic fibers with a black color free from color rendering and a dye useful for such a method. More specifically, it is an object of the present invention to provide a method for dyeing readily and at a low cost various hydrophobic fibers with a non-color rendering black color without requiring any special method, and a dye useful for such a method.

The present inventors have conducted various studies to solve the above problems and as a result, have found it possible to dye hydrophobic fiber material with a non-color rendering black color by employing a mixed dye comprising a specific disperse dye as a blue color component.

Thus, the present invention provides a method for dyeing hydrophobic fibers black, wherein a mixed black dye is used which comprises a blue color component containing at least 70 wt % of a disperse dye of the following formula (I):

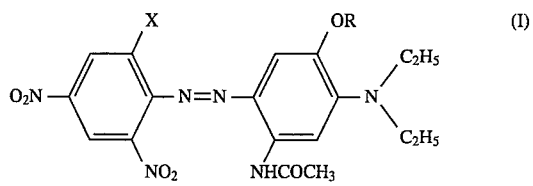

wherein X is a chlorine atom or a bromine atom, and R is a methyl group or an ethyl group, and the dye useful for the method.

Now, the present invention will be described in detail.

The disperse dye of the formula (I) is a known compound and can be prepared, for example, by the method disclosed in Japanese Examined Patent Publication No. 6592/1987.

The present invention is characterized by using a mixed black dye-comprising a blue color component containing at least 70 wt %, preferably at least 80 wt %, of a disperse dye of the formula (I). In the blue color component, less than 30 wt %, preferably less than 20 wt %, of other blue dyes, may be contained. As such other blue dyes, dyes of the following formulas (1) to (5) may, for example, be used:

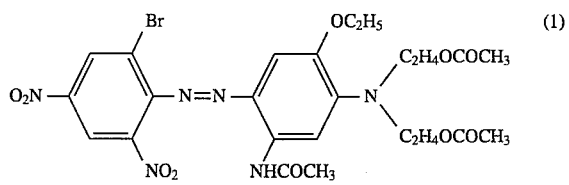

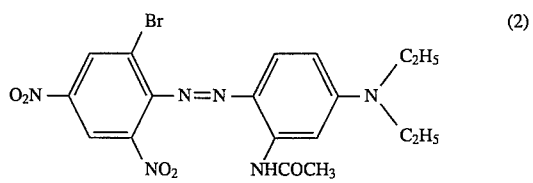

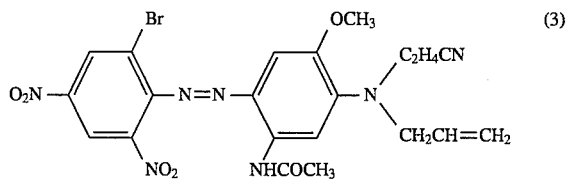

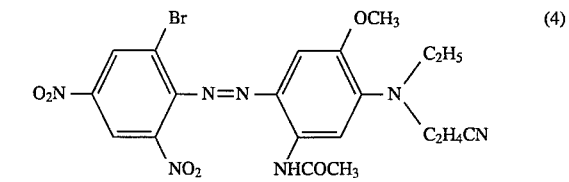

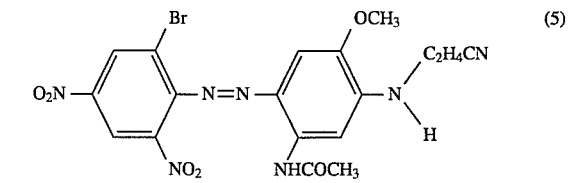

Among them, the dyes of the formulas (1) and (2) are preferred. Particularly preferred is the dye of the formula (2).

As other dyes to be incorporated together with the blue color component to constitute the mixed black dye, various orange or red disperse dyes may be mentioned. Specific examples include orange disperse dyes of the following formulas (6) to (13) and monoazo red disperse dyes of the following formulas (14) to (17).

The proportion of the blue color component in the mixed black dye-to be used in the present invention is usually from 50 to 70 wt %, and the proportion of the orange color

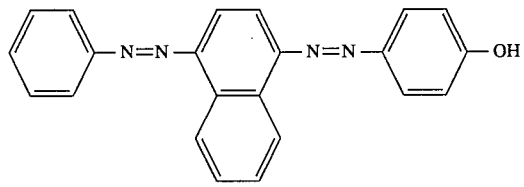
(6)

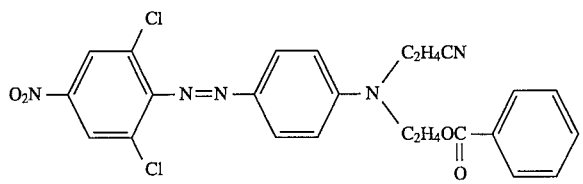
(7)

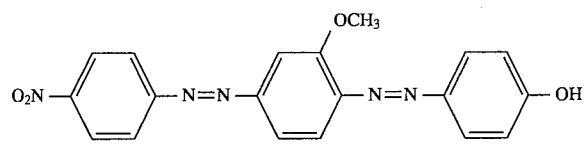
(8)

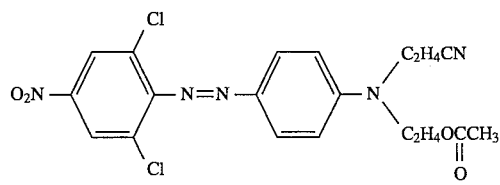
(9)

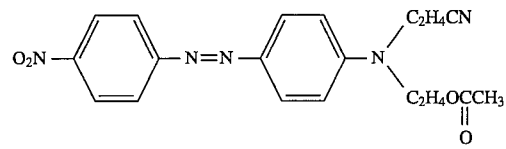
(10)

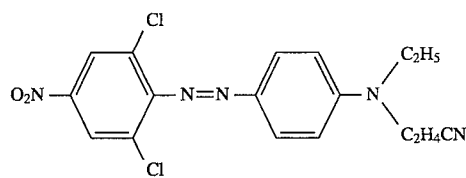
(11)

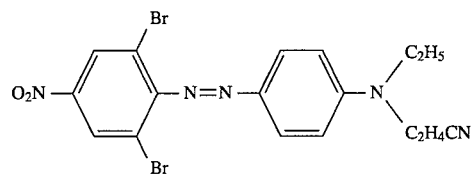
(12)

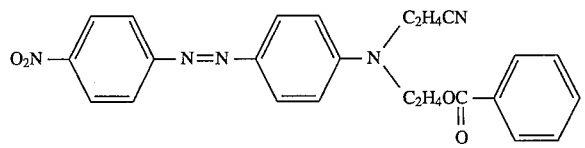
(13)

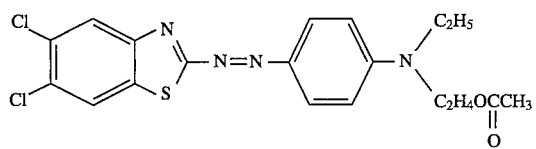
(14)

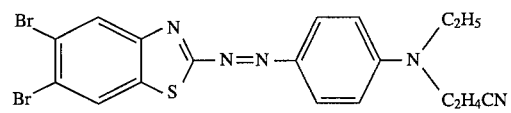
(15)

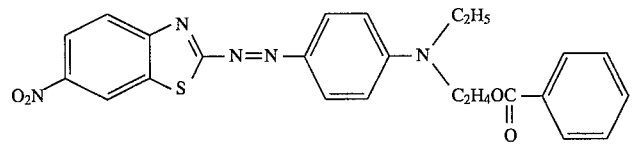
(16)

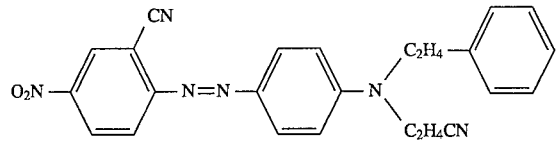
(17)

Among them, orange dyes of the formulas (11) and (13) are preferred as the blend component.

component and/or the red color component is usually from 50 to 30 wt %. So long as the content of the dye of the formula (I) in the blue color component is at least 70 wt %, preferably at least 80 wt %, it is possible to dye hydrophobic fibers with a non-color rendering black color, irrespective of the proportion of the blue color component.

The mixed black dye to be used in the present invention, is prepared, for example, by slurrying a dye cake together with a dispersing agent, for example, an anionic dispersant of sodium lignin sulfonate type or sodium naphthalene sulfonate type, followed by pulverization by a colloid mill such as a sand grinder, and if necessary, subjecting the product to dry pulverization by means of e.g. a spray dryer. Otherwise, the dye of the formula (I) and other dyes may be separately prepared and then blended. Or, cakes of the respective dyes may be blended to obtain the mixed black dye. As a useful dyeing method, various methods may be employed, such as high temperature dyeing, carrier dyeing, thermosol dyeing and pad steam dyeing.

Now, the present invention will be described in further detail with reference to Examples and Comparative Examples. However, it should be understood that the present invention is by no means restricted to such specific Examples.

EXAMPLE 1

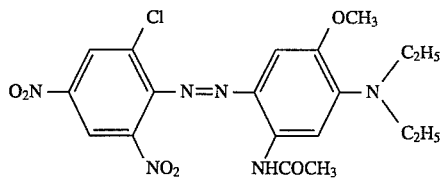

Blue dye (a) 30 parts by weight

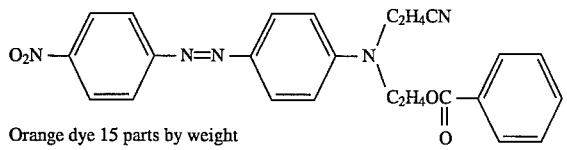

Orange dye 15 parts by weight

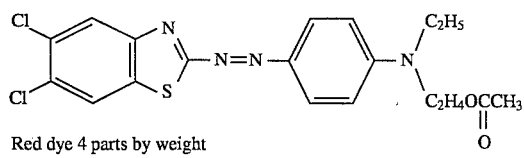

Red dye 4 parts by weight

Sodium lignin sulfonate 51 parts by weight

A dye mixture having the above composition is mixed with 300 parts by weight of water, and the mixture was subjected to wet milling by a sand grinder and dried by a spray dryer.

To 5 g of the obtained powdery disperse dye composition, 1,000 ml of water was added to obtain a dye bath, and the pH was adjusted to 5. Then, 100 g of a polyester cloth was dipped therein and subjected to exhaustion dyeing at 130° C. for one hour, followed by washing with water, reduction clearing, washing with water and drying to obtain a black-dyed cloth. With this dyed cloth, no substantial color change was observed under sunlight or under irradiation by a reflector lamp, and excellent color constancy under various light sources was observed.

EXAMPLE 2

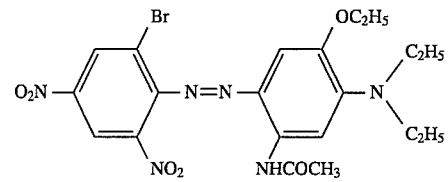

Blue dye (b) 24 parts by weight

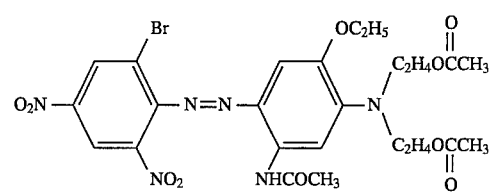

Blue dye (c) 3.6 parts by weight

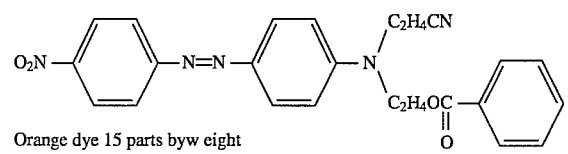

Orange dye 15 parts byw eight

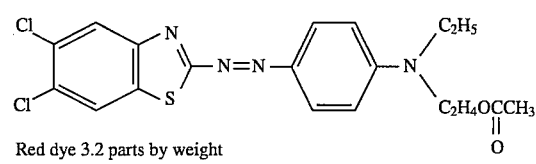

Red dye 3.2 parts by weight

Sodium lignin sulfonate 54.2 parts by weight

Using a dye mixture having the above composition, dyeing was carried out in the same manner as in Example 1 to obtain a black-dyed cloth. The color constancy under various light sources was as excellent as in Example 1.

COMPARATIVE EXAMPLE 1

Dyeing was carried out in the same manner as in Example 2 except that in Example 2, 16.6 parts by weight of blue dye (b) and 11.0 parts by weight of blue dye (c) were used, to obtain a black-dyed cloth. With this dyed cloth, the color changed to reddish black under irradiation by a reflector lamp, and the color constancy was inferior.

COMPARATIVE EXAMPLE 2

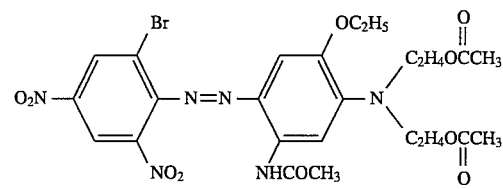

Blue dye (c) 33 parts by weight

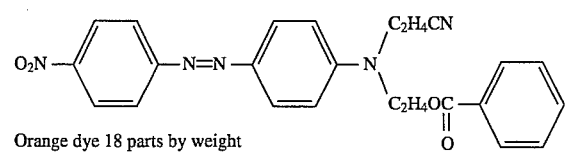

Orange dye 18 parts by weight

Sodium lignin sulfonate 49 parts by weight

Using a dye mixture having the above composition, a powdery disperse dye composition was obtained in the same manner as in Example 1, and using this composition, dyeing was carried out in the same manner as in Example 1, to obtain a black-dyed cloth. With this dyed cloth, the color changed to extremely reddish black under irradiation of a reflector lamp, and the color constancy was inferior.

As described in the foregoing, according to the present invention, it is possible to dye hydrophobic fibers including polyester fibers with a non-color rendering black color. The dye to be used in the present invention has excellent dyeing properties and provides a dyed color of black which is excellent in various fastnesses.

We claim:

1. A method for dyeing hydrophobic fibers black, which comprises applying thereto a mixed black dye which comprises a blue color component containing at least about 87 wt % of a disperse dye of the following formula (I):

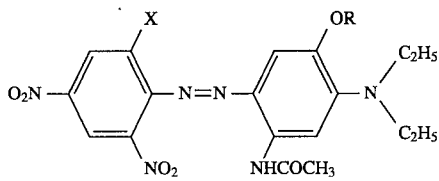

wherein X is a chlorine atom or a bromine atom, and R is a methyl group or an ethyl group.

2. The dyeing method according to claim 1, wherein the proportion of the blue color component in the mixed black dye is from 50 to 70 wt %.

3. A black dye for hydrophobic fibers comprising from 50 to 70 wt % of a blue dye containing at least about 87 wt % of a disperse dye of the following formula (I):

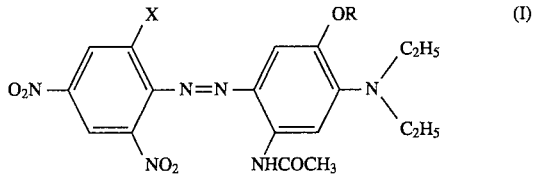

wherein X is a chlorine atom or a bromine atom, and R is a methyl group or an ethyl group, as a blue color component, and from 50 to 30 wt % of at least one dye selected from the group consisting of monoazo orange disperse dyes as an orange color component and monoazo red disperse dyes, as a red color component.

* * * * *